(12) United States Patent
Middlemiss

(10) Patent No.: US 8,335,574 B2
(45) Date of Patent: Dec. 18, 2012

(54) POWER CONTROLLING DEVICE AND METHODS OF USE

(76) Inventor: Andy Middlemiss, Highlands Ranch, CO (US)

( * ) Notice: Subject to any disclaimer, the term of this patent is extended or adjusted under 35 U.S.C. 154(b) by 240 days.

(21) Appl. No.: 12/633,254

(22) Filed: Dec. 8, 2009

(65) Prior Publication Data

US 2010/0145543 A1    Jun. 10, 2010

Related U.S. Application Data

(60) Provisional application No. 61/121,049, filed on Dec. 9, 2008.

(51) Int. Cl.
| | |
|---|---|
| *G05B 11/01* | (2006.01) |
| *G05D 17/00* | (2006.01) |
| *G05D 3/12* | (2006.01) |
| *H02J 1/04* | (2006.01) |
| *H02J 3/14* | (2006.01) |
| *G01R 19/00* | (2006.01) |
| *G06F 1/00* | (2006.01) |
| *G06F 1/26* | (2006.01) |

(52) U.S. Cl. .......... 700/22; 700/295; 700/297; 700/286; 307/35; 307/38; 307/116; 324/76.11; 713/300; 713/320; 713/330

(58) Field of Classification Search ............ 700/22, 700/295, 297; 307/35, 38–39, 116; 324/76.11; 713/300, 330
See application file for complete search history.

(56) References Cited

U.S. PATENT DOCUMENTS

| | | | |
|---|---|---|---|
| 4,292,546 A | 9/1981 | Clark | |
| 5,319,571 A | 6/1994 | Langer et al. | |
| 5,359,540 A | 10/1994 | Ortiz | |
| 5,862,391 A | 1/1999 | Salas et al. | |
| 6,445,087 B1 | 9/2002 | Wang et al. | |
| 6,507,273 B1 * | 1/2003 | Chang et al. | 340/3.1 |
| 6,744,150 B2 * | 6/2004 | Rendic | 307/38 |
| 7,171,461 B2 | 1/2007 | Ewing et al. | |
| 7,612,653 B2 * | 11/2009 | Miller et al. | 340/286.02 |
| 2003/0102717 A1 | 6/2003 | Tarr | |
| 2005/0052814 A1 | 3/2005 | McNally et al. | |
| 2006/0290208 A1 * | 12/2006 | Chang et al. | 307/116 |
| 2007/0271474 A1 | 11/2007 | Kim et al. | |
| 2007/0276548 A1 * | 11/2007 | Uzunovic et al. | 700/297 |

(Continued)

FOREIGN PATENT DOCUMENTS

WO    WO 2005/091460 A3    9/2005

*Primary Examiner* — Ryan Jarrett
*Assistant Examiner* — Darrin Dunn
(74) *Attorney, Agent, or Firm* — Albert Haegele; Leyendecker & Lemire, LLC

(57) ABSTRACT

A device for controlling power comprising a power source input, at least one power contact or outlet, a power control relay, a digital signal input port and a digital signal detector. The device controls power from the power source input to the at least one power contact or outlet by operation of the power control relay. The power control relay opens or closes based on the presence of a digital signal or lack thereof. The detection of the presence of the digital signal or the lack thereof is accomplished by the digital signal detector electrically coupled to the digital signal input port. Detection of a digital signal may be accomplished by using one or more Ethernet signal detectors capable of detecting data transmission or the presence of PoE. Additionally, a method is taught to control power to power consuming devices by using the aforementioned device.

1 Claim, 7 Drawing Sheets

U.S. PATENT DOCUMENTS

| | | |
|---|---|---|
| 2008/0140565 A1* | 6/2008 | DeBenedetti et al. .......... 705/39 |
| 2008/0218000 A1* | 9/2008 | Ohshiro et al. ............... 307/116 |
| 2009/0085586 A1* | 4/2009 | Anderson ..................... 324/705 |
| 2009/0236909 A1* | 9/2009 | Aldag et al. .................... 307/39 |
| 2009/0251127 A1* | 10/2009 | Kim ........................... 324/76.11 |
| 2010/0007334 A1* | 1/2010 | Apfel ........................ 324/123 R |
| 2010/0023784 A1* | 1/2010 | Schindler et al. ............. 713/300 |
| 2010/0102631 A1* | 4/2010 | Chiou ............................. 307/39 |
| 2011/0244715 A1* | 10/2011 | Aldag et al. .................. 439/488 |
| 2011/0296224 A1* | 12/2011 | Ewing et al. .................. 713/330 |

* cited by examiner

POWER CONTROLLING DEVICE AND METHODS OF USE

CROSS-REFERENCE TO RELATED APPLICATIONS

This application claims priority to U.S. Provisional Patent Application No. 61/121,049 filed Dec. 9, 2008, the full disclosure of which is incorporated herein by reference. The aforementioned provisional patent application has the same title and the same named inventor as the present application.

FIELD OF THE INVENTION

The present invention relates generally to an apparatus for controlling power delivery to electrically powered devices.

BACKGROUND

It is sometimes desirable to reduce unnecessary electric power consumption. Many devices, such as computer monitors, printers, fax machines, scanners, and audio equipment consume power when idle, and some devices consume power even when turned off. Other devices, such as lights, lamps, and other lighting devices, are often left on when not needed, such as when an office or other room is unoccupied for prolonged intervals. Interrupting electric power to electric devices is a way to reduce unnecessary or otherwise undesirable power consumption.

Numerous schemes are used or have been proposed to control a power supply to electric devices. For instance, locally-timed electric power controllers that have integral timers are plugged into electrical outlets, and are set to control power to power outlets over specific time intervals. These interrupters typically require that each device be set or programmed individually. Remote or central management of electric power controllers is often desirable, especially when many power controllers are used at multiple locations.

Remotely or centrally managed power controllers include devices that are managed via signals transmitted through a building's hardwired power distribution system, and controllers that are connected to and managed by a computer. Computer management of power controllers, including management via Ethernet connections, also exists or has been proposed. Typically, centrally or remotely-managed power control devices participate in information exchange with a central computing or other information processing or distribution source. These centrally managed power control devices require that relatively sophisticated information processing and exchange capability reside in each device.

One remotely managed power interruption device that does not require information exchange is disclosed in U.S. Pat. No. 6,744,150 ('150), which describes a power strip that energizes or de-energizes power strip outlets based on a five volt power tap on a computer. If a signal is received from the tap, which indicates the computer is running, the power strip would continue to supply power to its plugged-in devices. However, power synchronization between an interrupter and a controlling computer is undesirable because it is often desirable for computers to remain turned on continuously or for multi-day intervals. For instance, computers often need to remain powered throughout the night in order to receive network updates or run various applications that require significant CPU resources not available during normal working hours. The '150 reference discloses a power controller that interrupts power if, and only if, the controlling computer is turned off. Thus the prior art disclosed in '150 suffers from very primitive power management capability.

Ethernet technology, and digital signal technology generally, given its pervasive use in both commercial and residential applications combined with the highly programmable nature if its network elements provides a powerful way to manage electric power consumption. For instance, Ethernet switches have been used for remote or central control of power interrupters or controllers. However, existing Ethernet-managed power controllers engage in two-way communication with Ethernet switches and require processors for interpreting Ethernet signals and communicating with the Ethernet switches. See U.S. Pat. No. 6,507,273 ('273), U.S. Pat. No. 7,171,461 ('461), U.S. Pat. No. 6,445,087 ('087), and U.S. Pat. No. 6,744,150 ('150), as well as U.S. Pat. App. 2005/0052817 ('817).

The '273 reference describes a power controller that communicates with a remote computer via Ethernet, Internet, or other network connection, in part by sending a remote control program to the remote computer. The '817 and '461 references also disclose systems that have two-way communication with a remote computer. Thus existing power controlling devices require that information processing and two-way communication capability reside in the controllers themselves in order to achieve relatively sophisticated remote or central management of the power controllers. Consequently, there remains a need for a simplified device that can control power consumption by utilizing the many advanced features and sophisticated functionality existing in existing managed network devices, such as but not limited to Ethernet switches and routers.

DETAILED DESCRIPTION

Figure 1:
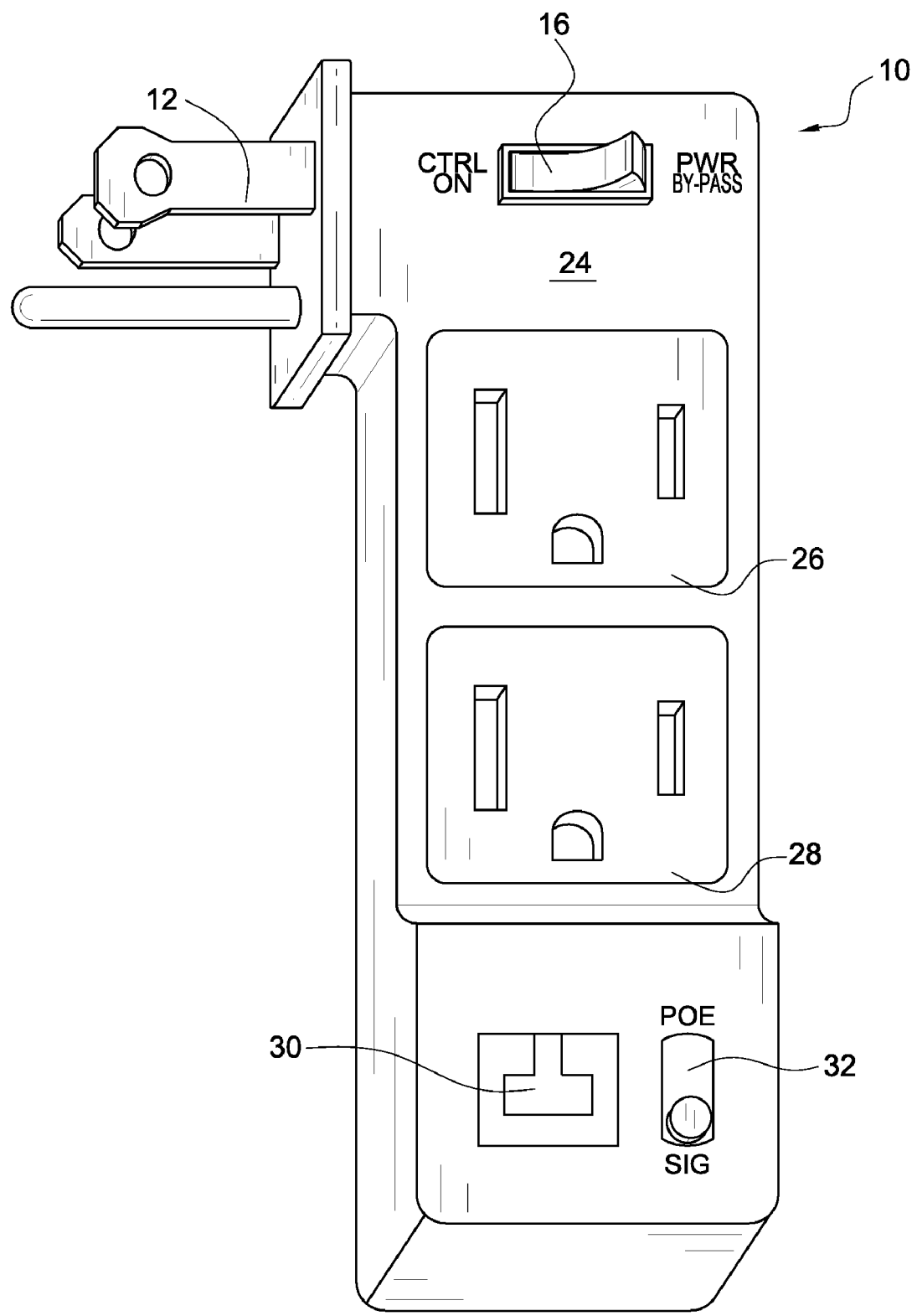
FIG. 1 is a perspective view of a power-controlling device according to an embodiment of the invention.

Embodiments of the power controlling device comprise an apparatus adapted to receive power from a power source and energize or de-energize one or more power contacts or outlets as part of a power control scheme. Power controlling devices enable central or remote management of the power controlling device without requiring that data processing or information exchange capability reside in the power controlling device. Thus, sophisticated power management schemes may be employed using this simple, economical, power controlling device that operates as a passive network element.

Embodiments of the power controlling device are adapted to energize or de-energize a power outlet or plurality of contacts or outlets as a consequence of detecting an Ethernet signal either by detecting data transmission or the presence of Power over Ethernet (PoE) on an Ethernet connection, with little or no data processing or interpretation. An Ethernet signal can be activated and deactivated in a variety of ways by utilizing the advanced capabilities and programmable characteristics of Ethernet devices. Furthermore, the power controlling device does not send communicative data back to the network source of the Ethernet signal. It is important to note that the Ethernet signal may or may not carry encoded information in the underlying signal. Thus, embodiments of the power controlling device are adapted to function in reaction to an Ethernet signal in the form of the presence of signaling activity or the presence of PoE regardless of the data content of the Ethernet signal.

An active Ethernet switch typically transmits a digital signal, the digital signal being received through the 3/6 pair of wires in a T-568B cable. The digital signal typically has a maximum time interval of 24 milliseconds. Some Ethernet switches apply one or more substantially constant voltage outputs, including, but not limited to, a voltage over the 3/6 pair in a T-568B cable for the purposes of powering various Ethernet network devices.

Embodiments of the power controlling device are adapted to use the presence or absence of an Ethernet signal, including but not limited to a digital signal with a 24 millisecond maximum time interval, as cues to energize or de-energize the power contacts or outlets. Power controlling devices do not require the Ethernet switch to receive any communication from the power controlling device, and thus do not need the Ethernet switch to recognize that the device is present, in order to be remotely managed by the Ethernet Switch. Similarly, power controlling devices do not decode or interpret any underlying communicative data of the Ethernet signal. An important feature of the power controlling device is that it merely detects the presence or absence of an Ethernet signal.

Embodiments of the power controlling device are adapted to react to, and thus be controlled by, an Ethernet signal, without engaging in two-way communication with a managing device such as an Ethernet switch. Power controlling devices need not receive a signal incorporating data or information in order for the remotely managed power interrupter to function and be remotely managed. It is to be appreciated that the power controlling device does not add an additional managed element for which a user need be concerned. Simple and effective power management can be achieved by use of the power controlling device with existing managed network devices, such as Ethernet switches and routers. The addition of two-way communications, encoded information in the signal requiring interpretation, programmable features, or other similar functionality to a power controller may detract from the simplicity and appeal of the present invention. Typically, power controlling devices are adapted to energize the power contacts or outlets when the device receives an Ethernet signal, and to de-energize the power contacts or outlets when the device does not receive an Ethernet signal. However, the converse is true for other embodiments of the invention, where a power controlling device is adapted to energize the power contacts or outlets when the device does not receive an Ethernet signal, and to de-energize the power contacts or outlets when the device does receive an Ethernet signal. Some embodiments may have a power by-pass or override function that permits a user to either semi-permanently or temporarily disable remote management and energize or de-energize the power contacts or outlets regardless of the Ethernet connection status.

Terminology

The terms and phrases as indicated in quotation marks (" ") in this section are intended to have the meaning ascribed to them in this Terminology section, applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning "either or both."

References in the specification to: "one embodiment"; "an embodiment"; "another embodiment"; "an alternative embodiment"; "one variation"; "a variation"; and similar phrases mean that a particular feature, structure, or characteristic described in connection with the embodiment or variation, is included in at least an embodiment or variation of the invention. The phrase "in one embodiment," "in one variation," or similar phrases, as used in various places in the specification, are not necessarily meant to refer to the same embodiment or the same variation.

The term "couple" or "coupled," as used in this specification and the appended claims, refers to either an indirect or direct connection between the identified elements, components or objects. Often the manner of the coupling will be related specifically to the manner in which the two coupled elements interact.

Throughout the specification and appended claims, the term "Ethernet signal" refers to any type of transmission utilizing an Ethernet protocol typically under but not limited to the IEEE 802.3 standard, such as but not limited to, the transmission of data frames or any other encoded waveform, and the transfer of electrical power as defined in but not limited to the IEEE 802.3af PoE standard.

The term "digital signal," as used in this specification and the appended claims, refers to any type of discrete-time signal, such as but not limited to a sampled and quantified analog signal, or continuous-time waveform signal, such as but not limited to a bit-stream. Furthermore, a "digital signal," as used in this specification and the appended claims, may be transmitted in a variety of ways such as but not limited to electrical, optical, microwave, and acoustical transmission.

Throughout the specification and appended claims, the terms "power contact" or "power contacts" refer to one or more electrical contacts adapted to supply power to a power consuming device. Additionally, the terms "power outlet" or "power outlets" refer to typical configurations of power contacts adapted to be removably coupled to and provide power to a power consuming device via a standard connection such as, but not limited, an AC power socket comprising female electrical contacts or connectors having slots or holes adapted to accept and deliver current to the prongs of inserted plugs. The combination of the general power contact concept and more specific power outlet embodiment and embodiments are often referred in this specification as "power contacts or outlets."

Embodiments of a Power Controlling Device

An embodiment of a power controlling device 10 for energizing or de-energizing a plurality of power contacts or outlets based on the based on the presence of an Ethernet signal is illustrated in FIGS. 1-3. It is to be appreciated that many variations and alternate embodiments of the invention may be used to energize or de-energize power contacts or outlets based on the presence of a digital signal or lack thereof.

Referring to FIG. 1, the power controlling device 10 comprises a housing 24, a power plug 12 connected to the housing 24 for obtaining power from an alternating current power source (not shown), a first power outlet 26, and a second power outlet 28, a power by-pass switch 16, a network-side RJ-45 connector 30, a device-side RJ-45 connector (not shown on FIG. 1, but represented in the schematic diagram of FIG. 2B), and a control selector switch 32. Several key components exist within the housing 24 of the power control device 10 and are depicted in the schematic diagrams of FIG. 2A-2C.

Figure 2A:
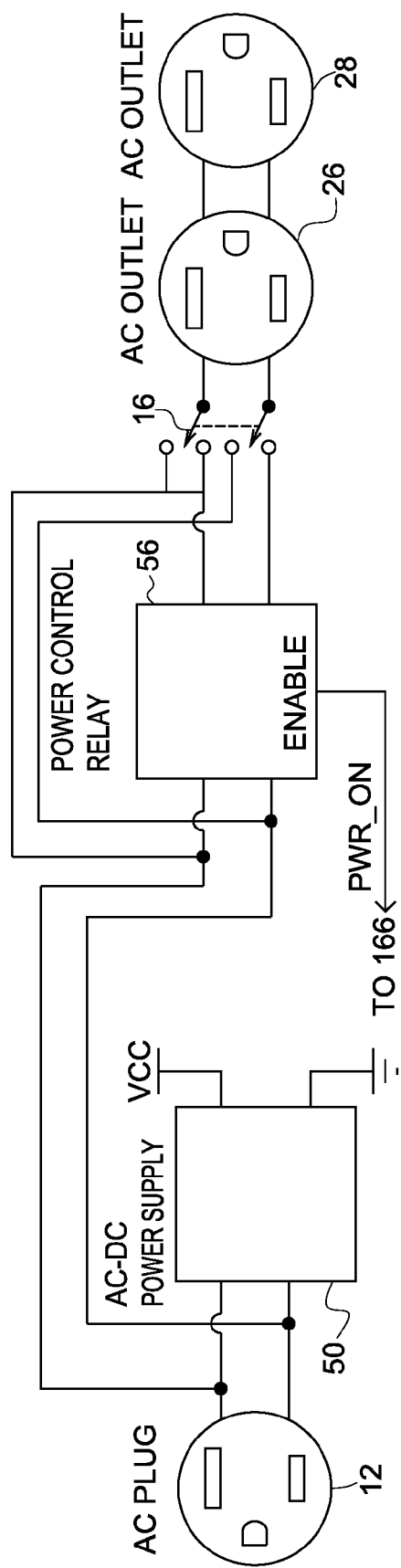
FIG. 2A is a schematic diagram for the power circuitry of the power controlling device according to one embodiment of the invention.

Referring to FIG. 2A, the power plug 12 is electrically coupled to an AC-DC power supply 50 and a power control relay 56. The power plug 12 serves as part of a power source input for the first embodiment power controlling device, the power source input being adapted to conduct or deliver electric power from an extrinsic power source to the AC-DC power supply 50 and power control relay 56. The AC-DC power supply 50 is adapted to provide a DC operating voltage Vcc source and ground for the electronics contained within the housing 24. The power control relay 56 is controlled by a "Power On" input lead and adapted to energize or de-energize the first and second power outlets. As shown in the schematic diagram, the power control relay 56 is adapted to energize or de-energize the first power outlet 26 and the second power outlet 28. The power by-pass switch 16 has two settings, "Control On" and "By-Pass." When the "Control On" setting is selected, the digital signal detection functionality is employed to energize or de-energize the power outlets. However, when the "By-Pass" setting is selected, the power outlets will be continually energized irrespective of the state of the power control relay 56.

Figure 2B:
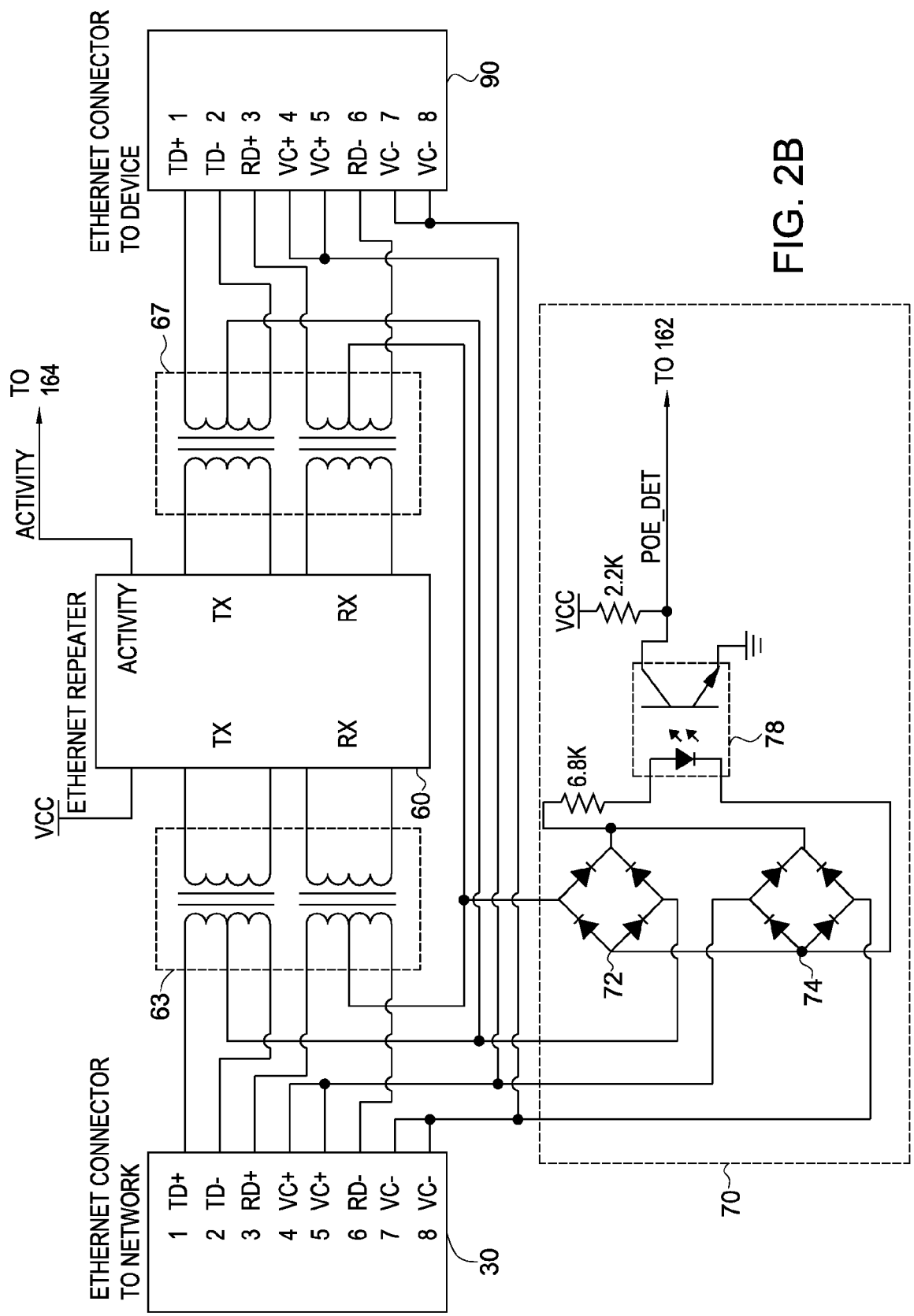
FIG. 2B is a schematic diagram of the digital signal detection circuitry of the power controlling device according to one embodiment of the invention.

A generalized and simplified schematic diagram of a digital signal repeater and detection circuitry of the power controlling device 10 is illustrated in FIG. 2B. The network-side RJ-45 connector 30 is electrically coupled to a first Ethernet transformer 63 and a PoE detection circuit 70. The first Ethernet transformer 63 is electrically coupled to an Ethernet repeater 60. The Ethernet repeater 60 provides an "Activity" output upon detection of transmission activity on an Ethernet signal. A second Ethernet transformer 67 is electrically coupled to the Ethernet repeater 60. The second Ethernet transformer 67 is electrically coupled to the device-side RJ-45 connector 90. Still referring to FIG. 2B, the PoE detection circuit 70 comprises a first full-wave rectifier 72 and a second full-wave rectifier 74. Additionally, a photocoupler 78 within the PoE detection circuit 70 is electronically coupled to receive the outputs of the first full-wave rectifier 72 and the second full-wave rectifier 74. The photocoupler 78 will provide a "PoE Detect" output upon detection of the presence of the electrical power on the Ethernet network.

Figure 2C:
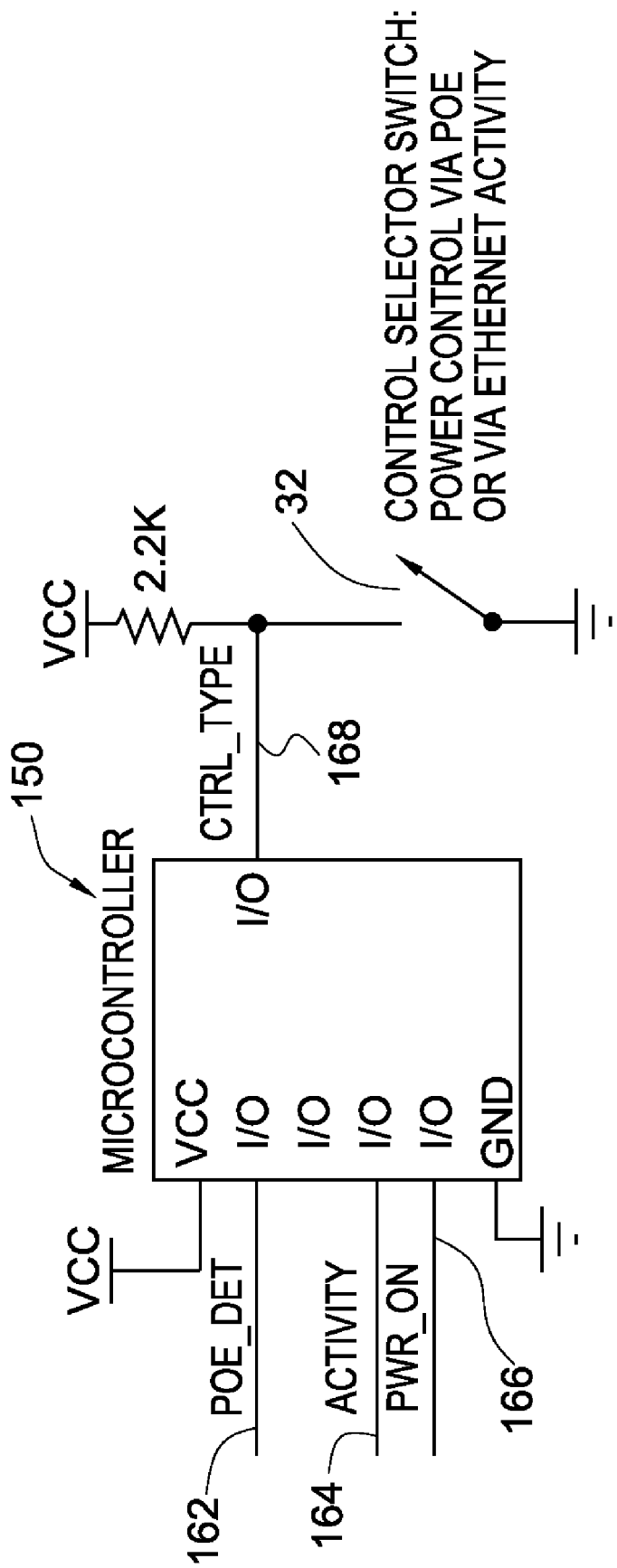
FIG. 2C is a schematic diagram of the microcontroller and control selector switch of the power controlling device according to one embodiment of the invention.

FIG. 2C shows a microcontroller 150 and its various input/output ports. An "Activity" port 164 is an input from the Ethernet repeater 60 depicted in FIG. 2B. The PoE detection circuit 70 also depicted in FIG. 2B supplies an input to the microcontroller 150 provides a "PoE Detect" port 162 as an input to the microcontroller 150. A "Control Type" port 168 is another input to the microcontroller 150 whose value is set by the control selector switch 32. Finally, a "Power On" port 166 is an output of the microcontroller 150 provided to the power control relay 56 diagrammed in FIG. 2A.

In operation, an Ethernet network source is provided to by a typical programmable Ethernet switch or similar Ethernet network source device. An Ethernet cable originating from the programmable Ethernet switch is plugged into the network-side RJ-45 connector 30 of power control device 10. Any device requiring AC power such as a lamp may be plugged into the first power outlet 26 or the second power outlet 28. However, it is worthy to note here that a myriad of electrically powered devices could be electrically coupled to or plugged into the aforementioned power contacts or outlets to obtain the power control benefits of the present invention.

Figure 3A:
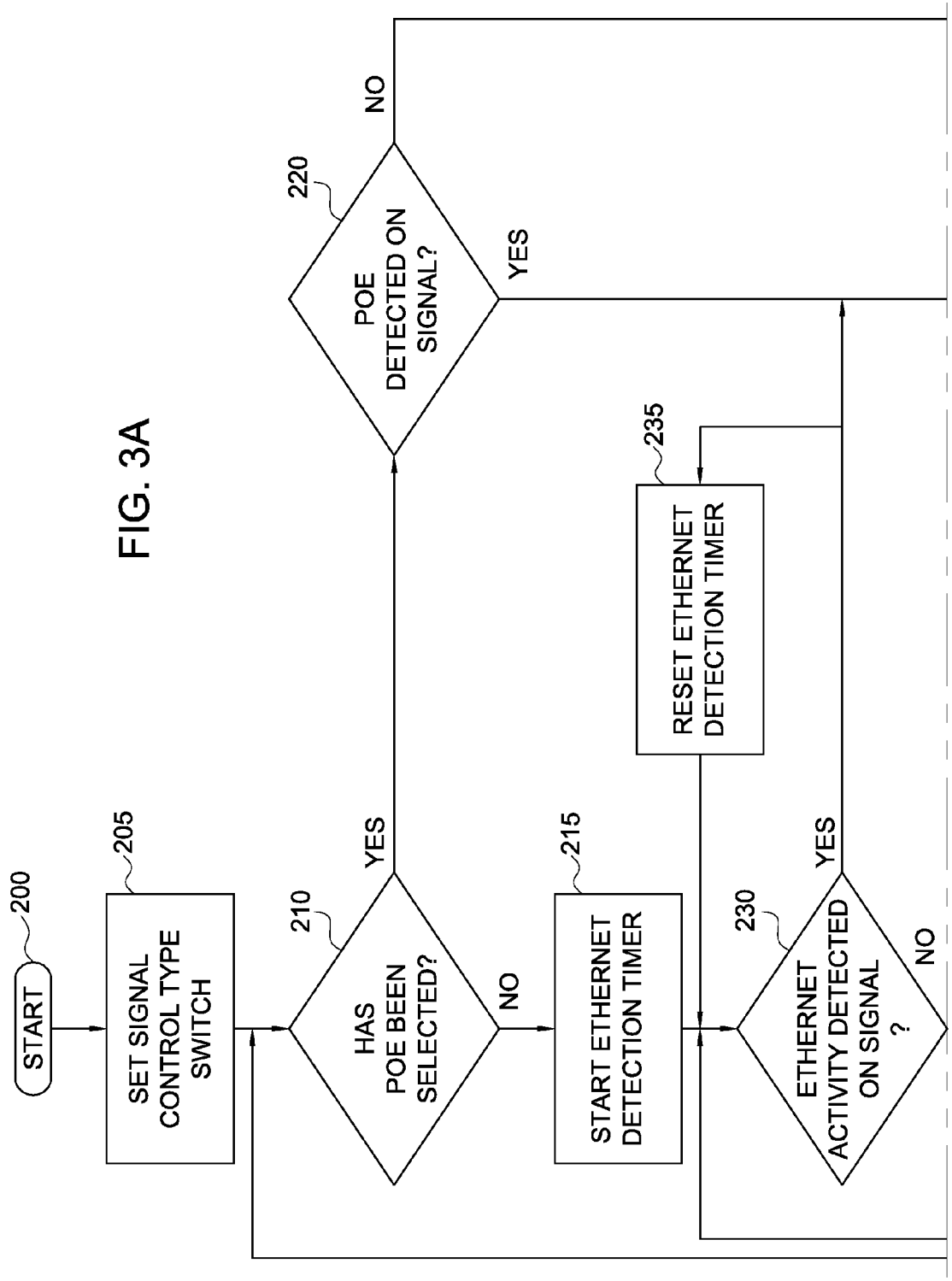
FIG. 3 is a flow chart illustrating the operation of the digital signal detection and power control algorithm according to one embodiment of the invention.
Figure 3B:
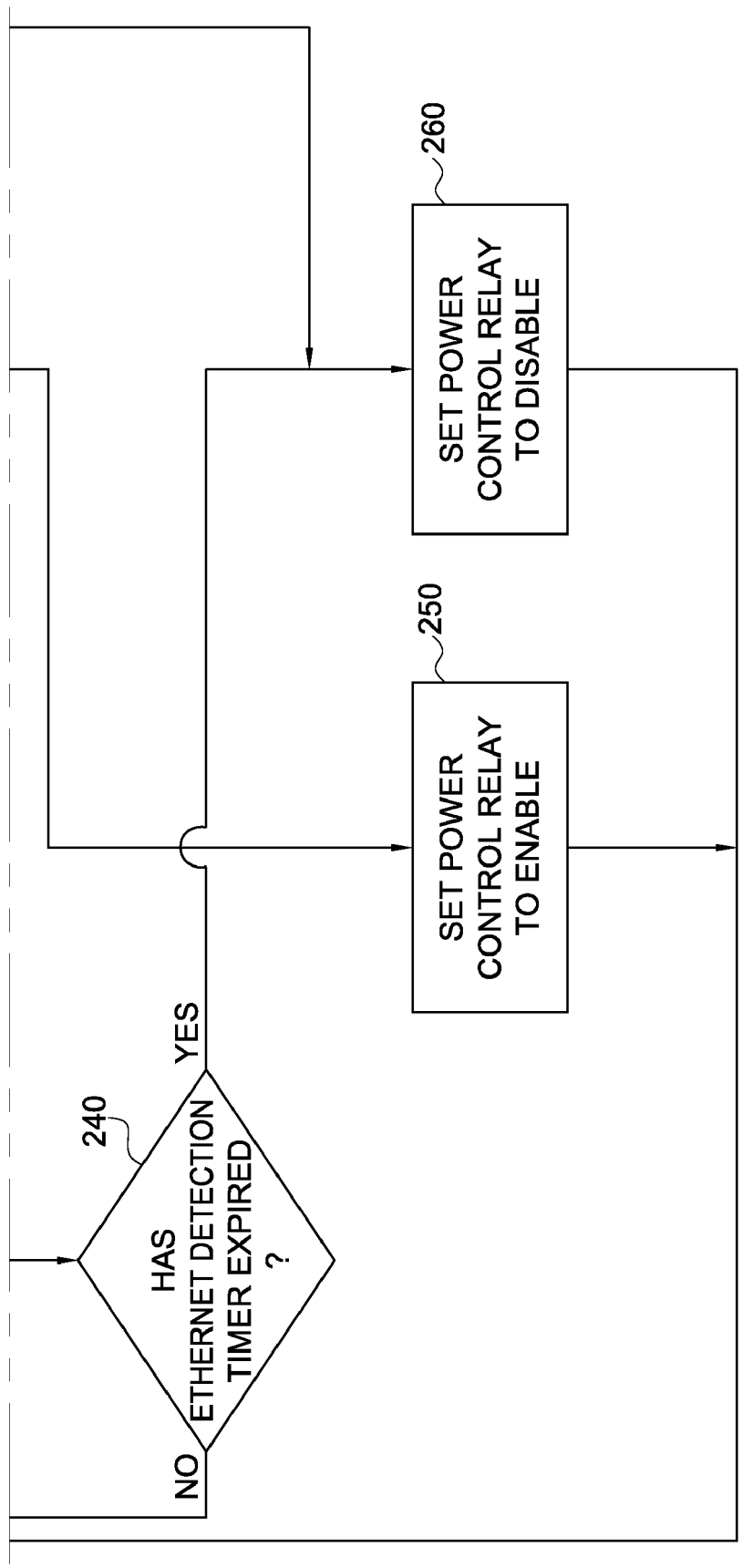

The basic operation of one embodiment power controlling device 10 is better understood with reference to the flow chart of FIG. 3. The operation of the digital signal detection and power control algorithm illustrated in FIG. 3 are divided between FIGS. 3A and 3B; however, this division is done solely due to the size of the flow chart and not intended to represent any relevant delineation. The flowchart begins with a start operation 200, which signifies commencement of a user's interaction with the power controlling device 10 and the algorithm employed by the microcontroller 150 therein. In the current embodiment, starting the operation of the digital signal detection and power control algorithm necessarily implies that the power by-pass switch 16 is set to "Control On." It is to be appreciated that some embodiments may not include a power by-pass function and rely solely on the power control electronics to energize or de-energize the power contacts or outlets.

As indicated in block 205, the user chooses the desired operational mode by selecting either the "PoE" or "Signal" mode on the control selector switch 32. When selecting "PoE" setting, the user is choosing a method of power control that will detect the presence of power over the Ethernet network connection or lack thereof. In contrast, when the "Signal" setting is selected, the user is choosing a method of power control that will detect the presence of Ethernet signal activity on the Ethernet network connection. Variations are contemplated wherein such a selection between the two aforementioned operational modes would be unnecessary. As would be obvious to one of ordinary skill in the art, auto-detection of either operational mode may be incorporated into microcontroller logic. Furthermore, simpler variations are contemplated wherein PoE detection functionality constitutes the only manner in which to detect an Ethernet signal or lack thereof. Likewise, simpler variations are contemplated wherein Ethernet signal activity detection functionality constitutes the only manner in which to detect an Ethernet signal or lack thereof.

Next, as indicated in decision block 210, the microcontroller 150 determines whether the "PoE" mode has been selected. If the "PoE" mode is selected, the control selector switch 32 will be open thereby setting the "Control Type" port 168 high. Generally, microcontroller ports can be set into a high (binary 1) by application of a high voltage in relation to Vcc or a low state (binary 0) by the application of a very low or no voltage signal in relation to ground.

Upon determining that the "PoE" mode has been selected, the microcontroller 150 determines whether or not there is power over the Ethernet connection as indicated in decision block 220. In one embodiment, whether power is present on the Ethernet connection is determined by the PoE detection circuit 70. There are several known methods for providing power to remote devices by injecting power into the Ethernet network connection. Several common PoE methods can be detected by the PoE detection circuit 70. The first full-wave rectifier 72 detects the presence of power over the Ethernet connection by receiving as an input the center tap of the TD+ and TD− leads (pins 1 & 2) from the Ethernet transformer 63 and the center tap of the RD+ and RD− leads (pins 3 & 6) from the Ethernet transformer 63. The first full-wave rectifier 72 is adapted to detect PoE utilizing a "phantom power" technique whereby the powered pairs may also carry data. Additionally, the second full-wave rectifier 74 is designed to detect a power signal by receiving as inputs the VC+ leads (pins 4 & 5) and the VC− leads (pins 7 & 8) of the network-side RJ-45 connector 30. When power exists on the Ethernet connection, either the first full-wave rectifier 72 or the second full-wave rectifier 74 provides a high output to the base of the photocoupler 78. When the base and emitter of the photocoupler 78 is forward biased (as is the case when power is detected on the Ethernet connection), the collector and emitter will be forward biased resulting in a closed circuit, which will set the "PoE Detect" lead 162 low. Although several methods are described herein, it is to be appreciated that other embodiments to detect the presence of power over an Ethernet connection are contemplated. Although not necessary to the invention, it may be desirable to have a latch circuit within the microcontroller 150 set high upon detection of a voltage output on the "PoE Detect" port 162 because there may exists momentary gaps in time when power is not being transmitted over the Ethernet connection that is not intended as a cessation of the Ethernet signal.

If PoE is detected, the power control relay 56 will be set to enable as shown in block 250. This activity is accomplished by the microcontroller 150 setting the "Power On" port 166 to high. By setting the "Power On" port 166 to high, the power control relay 56 will energize the first power outlet 26 and the second power outlet 28 by completing the circuit between the power outlets and the power plug 12. However, if PoE is not detected, the power control relay 56 will be set to disable as shown in block 260. This activity is accomplished by the microcontroller 150 setting the "Power On" port 166 to low, thereby causing the power control relay 56 to de-energize the first power outlet 26 and the second power outlet 28.

Referring back to decision block 210, if the "Signal" mode is selected, the control selector switch 32 will be closed thereby setting the "Control Type" port 168 low. Upon determining that the "Signal" mode has been selected, the microcontroller 150 starts an Ethernet detection timer as depicted in block 215. Because there may be time when no signal activity occurs, the timer provides a delay so that certain sporadic signal activity such as, but not limited, to link loop test packets or a similar keep-alive packets may be detected by the Ethernet repeater 60. The timer circuitry is typically wholly contained within the microcontroller 150 as one of ordinary skill in the art would employ in a typical microcontroller design. Next as identified in decision block 230, whether or not a signal is present on the Ethernet connection is determined. This signal detection function is accomplished by the Ethernet repeater 60. Typically, but not necessarily, signal transmission activity on an Ethernet signal is received through the RD+ and RD− leads (pins 3 & 6) on the network-side RJ-45 connector 30 from a T-568B Ethernet cable (or similar type cable) connected to the Ethernet network source device. A signal (if present) passes through the first Ethernet transformer 63, which primarily provides for isolation of the Ethernet repeater 60 from the external network, and into the repeater circuitry contained in the Ethernet repeater 60. The detection circuitry within the Ethernet repeater 60 is capable of detecting the presence of signal transmission activity. If signal transmission activity is detected, the Ethernet repeater 60 supplies a voltage output to indicate "Activity" on the Ethernet connection. However, if a signal is not detected, no voltage output is supplied to the "Activity" lead by the Ethernet repeater 60. The "Activity" lead from the Ethernet repeater 60 connects to the "Activity" port 164 of the microcontroller 150. Although not limiting to the invention, it is desirable to have a latch circuit within the microcontroller 150 set high upon detection of a voltage output on the "Activity" port 164 because Ethernet signals transmitted on an Ethernet connection are generally not continuous and may have anywhere up to an approximately 24 millisecond delay between successive signal waveforms.

Upon detection of an Ethernet signal, the Ethernet detection timer will be reset as noted in block 235. Further, as described in block 250, the power control relay 56 is set to enable. When the "Activity" port 164 is set to high as will be the case when an Ethernet signal has been detected, the microcontroller 150 sets the "Power On" port 166 to high. By setting the "Power On" port 166 to high, the "Power On" input lead will likewise be set to high and the power control relay 56 will energize the first and second power outlets. However, if no Ethernet signal is detected, the microcontroller 150 determines whether the Ethernet detection timer has expired as identified in decision block 240. If the Ethernet detection timer has not expired, then the microcontroller logic will loop back to the decision block 230 to determine whether or not a signal is present on the Ethernet connection. However, if the Ethernet detection timer has expired, then the microcontroller 150 will set the "Power On" port 166 to low thereby setting the "Power On" input lead to low. Thus, as described in block 260, the power control relay 56 will be set to disable. It is important to note that the Ethernet detection timer can be set to a very short time interval (such as 24 milliseconds) or a long time interval (such as one hour) depending on the required power control functionality.

Additionally, the power control device 10 serves as a passive network element for any downstream Ethernet network devices that may require the Ethernet signal for their network connectivity. Referring back to FIG. 2B, the Ethernet repeater 60 repeats the data signal and passes it through the second Ethernet transformer 67, which in turn passes the data signal to the device-side RJ-45 connector 90. The pertinent pins from the network-side RJ-45 connector 30 are either (i) directly electrically coupled to the device-side RJ-45 connector 90; or (ii) electrically coupled to the device-side RJ-45 connector 90 via the first Ethernet transformer 63 and the second Ethernet transformer 67. Furthermore, the power control device 10 is capable of passing PoE to any compatible downstream network-powered Ethernet device.

One Method of Controlling Power with a Power Controlling Device

Figure 4:
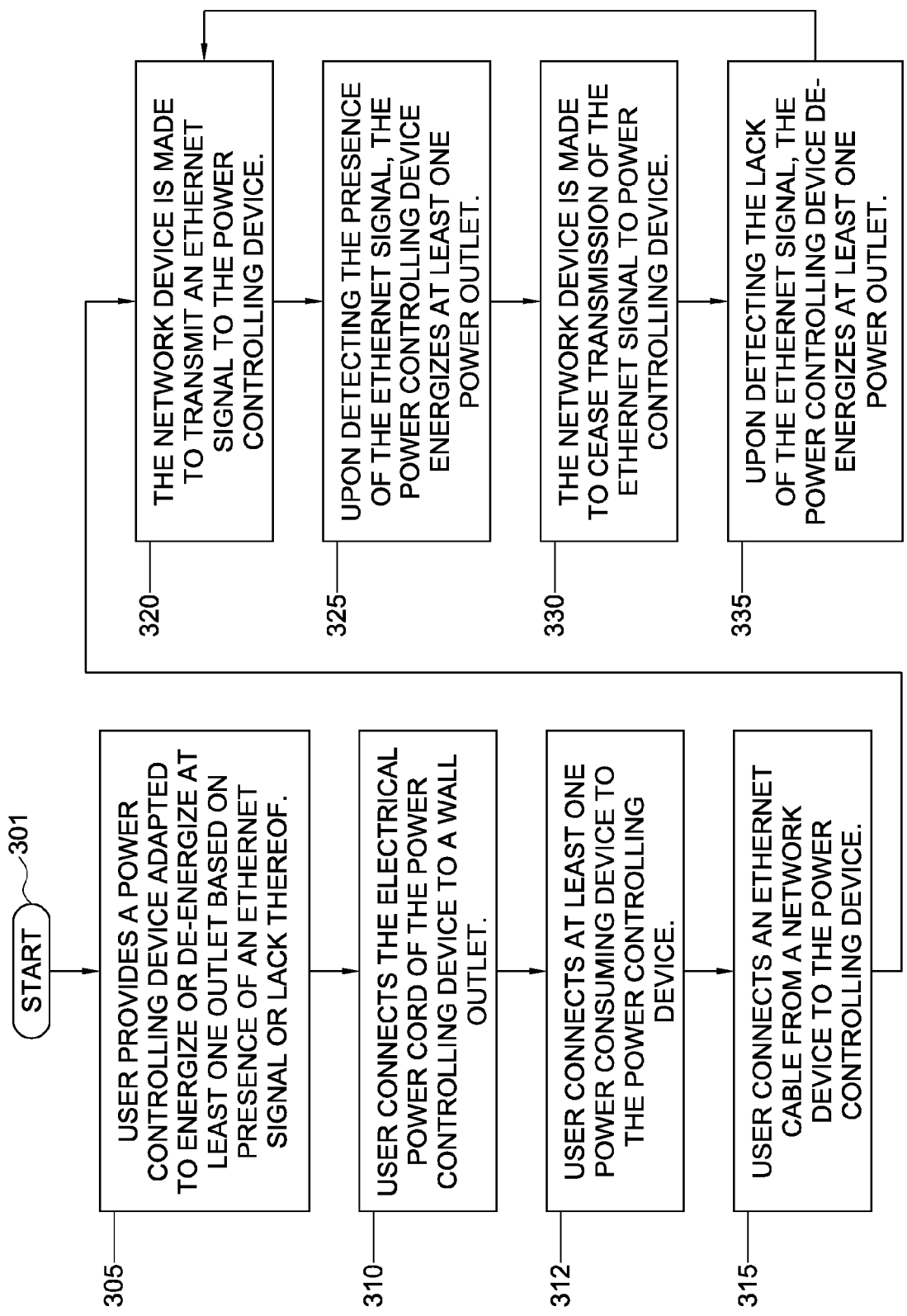
FIG. 4 is a flow chart describing an exemplary method of using an embodiment of the invention for controlling power delivery to electrically powered devices.

FIG. 4 is a flow chart illustrating a method of controlling power with a power controlling device such as, but not limited to, the embodiment depicted in FIGS. 1-3. The method is started (block 301) after a user identifies power consuming devices to be controlled. As shown in block 305, the user provides a power controlling device 10. The power controlling device 10 is adapted to energize or de-energize at least one power contact or outlet based on presence of an Ethernet signal or lack thereof. As described in detail above, the power controlling device 10 may be designed to detect the presence of an Ethernet signal or lack thereof by using digital signal detection circuitry to identify the presence of Ethernet signal activity through data transmission or power detection circuitry to determine whether PoE is present on the Ethernet connection. It is to be appreciated that there are a multitude of ways to detect the presence of an Ethernet signal other than through the detection of Ethernet signal transmission activity and/or PoE that are contemplated in the present invention.

Next as shown in block 310, the power plug 12, or alternatively an electrical power cord, of the power controlling device 10 is connected to a wall outlet or some other power source by the user. This activity provides the power controlling device 10 with power to energize or de-energize the power consuming devices. A wall outlet typically provides 120 V AC power; however, it is to be appreciated that the power controlling device 10 and its method of use applies equally to other types of power sources such as, but not limited to, a −48 V power plant.

The user next connects the power consuming devices to the at least one power contact or outlet on the power controlling device as described in block 312. For example, a user may plug a lamp into the first power outlet 26 and printer the second power outlet 28 among other devices into the power controlling device 10.

Block 315 instructs the user to connect an Ethernet cable for a network device capable of providing a network source to the power controlling device 10. The Ethernet cable would be connected to the network-side RJ-45 connector 30. Next as shown in block 320, the network device capable of providing an Ethernet signal is made to transmit data and/or provide PoE to the power controlling device 10. An Ethernet signal may be activated by a network source device on the Ethernet port for which the network cable is connected to the power controlling device 10 by a variety of ways such as, but not limited to: (i) locally programming the network source device via its craft interface to activate the Ethernet signal; (ii) remotely accessing the network source device to activate the Ethernet signal; (iii) using a scheduler or similar application to activate the Ethernet signal at a various predetermined dates and times; or (iv) using a peripheral device such as, but not limited to, a motion sensor or a fingerprint verifier, operatively coupled to the network source device, wherein the network source device is programmed to activate the Ethernet signal when certain conditions from the peripheral device are met.

As described in block 325, the power controlling device 10 energizes the at least one power contact or outlet upon detecting the presence of an Ethernet signal. As previously discussed, the presence of an Ethernet signal may be established by detecting data transmission on the Ethernet signal or PoE provided by the network source device. Referring back to FIG. 2A, the first power outlet 26 and the second power outlet 28 are energized by setting the power control relay 56 to "enable," thereby changing the configuration of the power control relay 56 from an open state to a closed state and allowing power to pass from the power plug 12 to the first and second power outlets. This operation presumes that the power by-pass switch 16 is set to "Control On" meaning that the digital signal detection circuitry within the power controlling device 10 is utilized to determine whether the first and second power outlets will be energized or de-energized.

Next in block 330, the network source device capable of providing an Ethernet signal is made to cease signal transmission activity or providing PoE to the power controlling device 10. As described above in the context of creating the presence of an Ethernet signal, the operation of ceasing presence of an Ethernet signal may be accomplished by a variety of ways such as, but not limited to: (i) locally programming the network source device via its craft interface to deactivate the Ethernet signal; (ii) remotely accessing the network source device to deactivate the Ethernet signal; (iii) using a scheduler or similar application to deactivate the Ethernet signal at a various predetermined dates and times; or (iv) using a peripheral device such as, but not limited to, a motion sensor or a fingerprint verifier, operatively coupled to the network source device, wherein the network source device is programmed to deactivate the Ethernet signal when certain conditions from the peripheral device are met.

Block 335 describes that when the lack of an Ethernet signal is detected, the power controlling device 10 will de-energize the first and second power outlets. As previously discussed, the lack of an Ethernet signal may be established by power controlling device 10 not detecting data transmission activity or not detecting PoE being provided by the network source device for a specified timeframe. The first power outlet 26 and the second power outlet 28 are de-energized by setting the power control relay 56 to "disable," thereby breaking the circuit from the power plug 12 to the first and second power outlets by changing the configuration of the power control relay 56 from a closed state to an open state. As noted with respect to block 325, this operation presumes that the power by-pass switch 16 is set to "Control On."

Next, the method of controlling power with a power controlling device continues as expressed in the loopback arrow from block 335 to block 320 until the user of said method no longer desires to control power to the power consuming devices from the power contacts or outlets.

Alternate Embodiments and Variations

As is within the knowledge of one of ordinary skill in the art, numerous other digital signal detectors could be substituted for the Ethernet repeater 60 and detection circuitry therein. Some embodiments comprise digital signal detectors adapted to detect other analogue or pulse width modulated signals. For example, detection of Ethernet signal activity is accomplished in an alternate embodiment by utilizing detection circuitry that "listens" for Ethernet activity on the RD+ and RD− leads (pins 3 & 6) in the form of data being transmitted by a network source or, in the absence of data transmission, other transmissions at various layers such as, but not limited to, link layer protocol transmissions, data link layer transmissions, and physical layer transmissions. For instance, link test pulses being sent by an Ethernet network source may be used for detecting the presence of Ethernet signal activity or the lack thereof. Link test pulses, which are sent to a physical-layer medium attachment unit to monitor for link integrity are described in the IEEE 802.3 specification at clause 14 and therein.

In one variation the power controlling device, a temporary override switch may be utilized instead of or in addition to the power by-pass switch 16. Referring back to FIGS. 1 & 2A, it is contemplated that the in such a version, a temporary override switch would typically be a push-button switch electrically coupled to the microcontroller 150, wherein the microcontroller 150 would temporarily ignore any Ethernet signal detection circuitry and set the "Power On" port 166 to high. As described earlier in the specification, by setting the "Power On" port 166 to high, the "Power On" input lead will likewise be set to high and the power control relay 56 will energize the one or more power contacts or outlets. Further, the normal operation of any Ethernet signal detectors in the power controlling device 10 would resume after a specified time period without any interaction on the part of the user who engaged the temporary override switch. Given the benefit of this disclosure, one of ordinary skill in the art could employ a countdown timer, reset trigger, or similar design within the microcontroller 150 to provide the temporary override function.

Some embodiments comprise an adjustable relay with an adjustable time interval. The adjustable relay enables a user to modulate the timing for opening and closing of the relay, such that the power controlling device can be adjusted to remain closed for a predetermined interval after the last Ethernet signal is received.

Additionally, at least one embodiment of the power controlling device comprises a plurality of device-side RJ-45 connectors, in addition a plurality of network-side RJ-45 connectors. Such embodiments permit a plurality of Ethernet signals to pass uninterrupted through the power controlling device. In contrast, some embodiments do not have any Ethernet signal regeneration functionality nor accompanying device-side RJ-45 connectors as it may not be necessary to pass the Ethernet signal to a downstream network device in some applications of the inventive concept. Some embodiments include an electronic filter to optimize the incoming Ethernet signal by either removing undesirable signal components or enhancing desired signal components.

Some embodiments of the power controlling device are adapted to be installed in-line with the power consuming devices that they are used with. Hence, the one or more power contacts can be directly spliced to the power input leads of one or more power consuming device. Hence, the power controlling device can be installed within a wall, ceiling, wiring closet or other locations where either the power consuming devices do not typically have power plugs (e.g., ceiling lights) or there is insufficient space to incorporate one or more power outlets and power plugs.

Furthermore, some embodiments include a surge protector that regulates voltage to any devices plugged into power outlets. The surge protector blocks or grounds out voltages that are above a safe threshold. Other embodiments comprise power contacts or outlets other than 120-volt, 15 or 20-amp AC outlets, including but not limited to, 220-volt AC outlets, DC outlets, and 600-volt outlets.

Contact Closure Controlling Variations and Alternate Embodiments

Other variations and alternate embodiments of the power controlling device comprise utilizing the digital signal repeater and detection circuitry to control other aspects beyond controlling power to one or more other devices. For example, the power controlling device as disclosed herein can be modified into a contact controlling device. As opposed to controlling contact closures for energizing one or more power consuming devices, the contact controlling device activate and deactivating contact closures for one or more devices. The contact closures activated and deactivated by the contact controlling function can be power switches for one or more devices. However, more typically the contact closures control a variety of functions and options associated with the one or more devices.

An exemplary embodiment of a contact controlling variation of a power controlling device comprises: one or more contact closures; one or more digital signal input ports; at least one digital signal detector, the at least one digital signal detector being operatively coupled to at least one of the one or more digital signal input ports and adapted to detect a presence of a digital signal or a lack thereof; and a contact control relay, the contact control relay being electrically coupled to at least one of the one or more contact closures, and comprising (i) a first position adapted to open the at least one of the one or more contact closures based on whether the at least one digital signal detector detects one of the presence of a digital signal or the lack thereof, and (ii) a second position adapted to close the at least one of the one or more contact closures based on whether the at least one digital signal detector detects the other of the presence of a digital signal or the lack thereof.

Additionally, a contact closure controlling system comprises: a network device capable of being alternatively in either one of a first condition or a second condition, the first condition being providing an Ethernet signal and the second condition being not providing the Ethernet signal; a first Ethernet cable, the first Ethernet cable being operatively coupled to the network device; and a variation of the power controlling device or a contact controlling device. The variation of the power controlling device or contact controlling device of the contact closure controlling system comprises: one or more contact closures, the one or more contact closures providing an open or closed circuit when electrically coupled to one or more devices; a contact control relay, the contact control relay being electrically coupled to at least one of the one or more contact closures, and comprising a first configuration and a second configuration, the first configuration opening the at least one of the one or more contact closures and the second condition closing the at least one of the one or more contact closures.

The contact closure controlling system further comprises: a first connector, the first connector being in receipt of and electrically coupled to the first Ethernet cable; and a Power over Ethernet detection circuit, the Power over Ethernet detection circuit being electrically coupled to the first connector and adapted to (a) detect a presence of power being transferred over the first Ethernet cable and (b) provide an output when the presence of power being transferred over the first Ethernet cable is detected; a microcontroller, the microcontroller adapted to (i) measure the output of the Power over Ethernet circuit during a time interval and (ii) control the operation of the contact control relay based on the measurement of the output of the Power over Ethernet circuit during the time interval; and at least one device, the at least one device being adapted to be controlled contact closures and electrically coupled to the at least one of the one or more contact closures. Non-limiting examples of the at least one device adapted to be controlled contact closures and electrically coupled to the at least one of the one or more contact closures are temperature sensors or thermostats.

An exemplary method of using a variation of the power controlling device or a contact controlling device can be performed wherein the variation of the power controlling device or the contact controlling device comprises: (i) one or more contact closures, (ii) a contact control relay, (iii) a first connecter adapted to receive a first Ethernet cable, and (iv) an Ethernet signal detector adapted to detect a presence of an Ethernet signal or a lack thereof. The variation of the power controlling device or contact controlling device is adapted to either open or close at least one of the one or more contact closures when the presence of an Ethernet signal has been detected and either open or close the at least one of the one or more contact closures when the presence of an Ethernet signal has not been detected.

The exemplary method comprises: connecting at least one device adapted to be controlled using contact closures to the one or more contact closures; connecting an Ethernet cable from a network source to the first connector; transmitting an Ethernet signal from the network source; and changing the contact control relay from an open configuration to a closed configuration, the open configuration being adapted to open the one or more contact closures and the closed configuration being adapted to close the one or more contact closures.

The various embodiments and variations thereof illustrated in the accompanying figures and/or described above are merely exemplary and are not meant to limit the scope of the invention. It is to be appreciated that numerous variations to the invention have been contemplated as would be obvious to one of ordinary skill in the art with the benefit of this disclosure. All variations of the invention that read upon the appended claims are intended and contemplated to be within the scope of the invention.

I claim:

1. A power controlling device comprising;
a power source input;
one or more power contacts;

one or more digital signal input ports;

at least one digital signal detector, the at least one digital signal detector being operatively coupled to at least one of the one or more digital signal input ports and adapted to detect a presence of a digital signal or a lack thereof;

a power control relay, the power control relay being electrically coupled to the power source input and at least one of the one or more power contacts, and comprising (i) a first position adapted to energize the at least one of the one or more power contacts based on whether the at least one digital signal detector detects one of the presence of a digital signal or the lack thereof, and (ii) a second position adapted to de-energize the at least one of the one or more power contacts based on whether the at least one digital signal detector detects either the presence of a digital signal or the lack thereof, wherein the one or more digital signal input ports includes a connector adapted to receive an Ethernet signal and the one or more power contacts includes a power outlet adapted to receive a power plug from a power consuming device and the at least one digital signal detector includes a first Ethernet signal detector adapted to detect a presence of transmission activity on an Ethernet connection and a second Ethernet signal detector adapted to detect a presence of power over the Ethernet connection; and a control selector switch adapted to adopt one of either a first position enabling the use of the first Ethernet signal detector or a second position enabling the use of the second Ethernet signal detector.

* * * * *